United States Patent
Poot et al.

(10) Patent No.: US 8,963,927 B2
(45) Date of Patent: Feb. 24, 2015

(54) VERTEX-BAKED THREE-DIMENSIONAL ANIMATION AUGMENTATION

(75) Inventors: Rudy Poot, Clyde Hill, WA (US); Robert Crocco, Jr., Seattle, WA (US); Chris Miles, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 602 days.

(21) Appl. No.: 12/969,385

(22) Filed: Dec. 15, 2010

(65) Prior Publication Data
US 2012/0154409 A1   Jun. 21, 2012

(51) Int. Cl.
G06T 13/00   (2011.01)
G06T 13/20   (2011.01)

(52) U.S. Cl.
CPC .............. *G06T 13/20* (2013.01); *G06T 2210/36* (2013.01)
USPC .......................................... 345/473; 345/474

(58) Field of Classification Search
CPC .......... A63F 13/10; A63F 2300/63–2300/638; G06T 13/00–13/40; G06T 2213/00–2213/12
USPC ................................................. 345/473–475
See application file for complete search history.

(56) References Cited

U.S. PATENT DOCUMENTS

| | | | |
|---|---|---|---|
| 5,977,977 A | 11/1999 | Kajiya et al. | |
| 7,339,590 B1 | 3/2008 | Moskal et al. | |
| 7,843,455 B2 * | 11/2010 | Bridger et al. | 345/473 |
| 7,931,604 B2 * | 4/2011 | Even Zohar et al. | 600/595 |
| 2005/0264566 A1 * | 12/2005 | Sommers | 345/423 |
| 2006/0252533 A1 * | 11/2006 | Sakaguchi et al. | 463/31 |
| 2007/0225961 A1 * | 9/2007 | Ritts et al. | 703/21 |
| 2008/0318676 A1 * | 12/2008 | Ham | 463/35 |
| 2009/0082701 A1 | 3/2009 | Zohar et al. | |
| 2010/0128037 A1 * | 5/2010 | Hoffman et al. | 345/426 |

FOREIGN PATENT DOCUMENTS

CN   101689278 A   3/2010

OTHER PUBLICATIONS

Sueda et al., Musculotendon Simulation for Hand Animation, ACM Transactions on Graphics—Proceedings of ACM SIGGRAPH 2008, vol. 27, Issue 3, Article No. 83, Aug. 2008.*

Xia et al., Dynamic View-Dependent Simplification for Polygonal Models, Proceedings of the 7th IEEE Visualization Conference, 1996.*

(Continued)

*Primary Examiner* — Charles Tseng
(74) *Attorney, Agent, or Firm* — Gregg Wisdom; Judy Yee; Micky Minhas

(57) ABSTRACT

A method for controlling presentation of three dimensional (3D) animation includes rendering a 3D animation sequence including a 3D vertex-baked model which is derived from a 3D animation file including vertex data of every vertex for every 3D image frame in the 3D animation sequence. The 3D vertex-baked model includes a control surface that provides a best-fit 3D shape to vertices of the 3D vertex-baked model. The method further includes receiving a motion control input, and if the motion control input is received during an augmentation portion of the 3D animation sequence, deviating from a default posture of the control surface in accordance with the motion control

18 Claims, 4 Drawing Sheets

(56) References Cited

OTHER PUBLICATIONS

Kim, et al., "Adaptation Method for Level of Detail (LOD) of 3D contents", Retrieved at <<http://ieeexplore.ieee.org/stamp/stamp.jsp?tp=&arnumber=4351598 >>, NPC Workshops IFIP International Conference on Network and Parallel Computing Workshops, Sep. 18-21, 2007, pp. 879-884.

"Baking to textures and vertices", Retrieved at <<http://download.autodesk.com/us/maya/2009help/index.html?url=mrfMS_Baking_to_textures_and_vertices.htm,topicNumber=d0e512682 >>, Retrieved Date: Sep. 10, 2010, pp. 2.

"LW_Baker: Vertex Baking Beethoven", Retrieved at <<http://www.newtek.com/lightwave/tutorials/rendering/lw_baker_beethoven/lw_baker_beethoven.html >>, LightWave® 6.5, Retrieved Date: Sep. 10, 2010, pp. 5.

Teler, Eyal., "Streaming of Complex 3D Scenes for Remote Walkthroughs", Retrieved at <<http://www.cse.huji.ac.il/labs/cglab/papers/streaming/TelerThesis.pdf >>, Dec. 11, 2001, pp. 39.

Malik, Shahzad., "Dynamic Level of Detail Representation of Interactive 3D Worlds", Retrieved at <<http://www.cs.utoronto.ca/~smalik/downloads/paper_495.pdf >>, Apr. 10, 2000, pp. 1-39.

Hoeller, et al., "Optimizing Resource Management with Multistreaming", Retrieved at <<http://http.developer.nvidia.com/GPUGems2/gpugems2_chapter05.html >>, Retrieved Date: Sep. 10, 2010, pp. 19.

"Turtle", Retrieved at <<http://www.touchvision.co.zakendering/ >>, Retrieved Date: Sep. 10, 2010, pp. 9.

State Intellectual Property Office of China, Office Action of Chinese Patent Application No. 201110443243-9, Feb. 8, 2014, 17 pages.

The State Intellectual Property Office of the People's Republic of China, Second Office Action Issued in Chinese Patent Application No. 201110443243.9, Mailed Dated: Jul. 7, 2014, 7 Pages.

\* cited by examiner

VERTEX-BAKED THREE-DIMENSIONAL ANIMATION AUGMENTATION

BACKGROUND

High-resolution three dimensional (3D) animation typically includes a tremendous level of detail that produces photo-realistic or "movie quality" imagery and provides an immersive entertainment experience. Such high-resolution 3D animation is desirable in an interactive gaming setting to provide realistic game-play. However, due to the level of detail in high-resolution 3D animation, dynamically modeling and rendering such 3D animation to correspond to user interaction is processing resource intensive. Thus, the resolution and/or other quality enhancing aspects of 3D animation for interactive gaming may be restricted by game engine and device hardware capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for controlling presentation of three dimensional (3D) animation in accordance with embodiments of the present disclosure includes rendering a 3D animation sequence. The 3D animation sequence includes a 3D model that is derived from a 3D animation file including vertex data of every vertex for every 3D image frame in the 3D animation sequence. The vertex data of the 3D animation sequence is stored or baked to the 3D model to generate a 3D vertex-baked model where the vertex data (e.g., movement, texture, lighting, etc.) is mapped into each vertex of the 3D vertex-baked model for the 3D animation sequence. The 3D vertex-baked model includes a control surface that provides a best-fit 3D shape to vertices of the 3D vertex-baked model. The method further includes receiving a motion control input, and if the motion control input is received during an augmentation portion of the 3D animation sequence, deviating from a default posture of the control surface in accordance with the motion control input.

DETAILED DESCRIPTION

Figure 1:
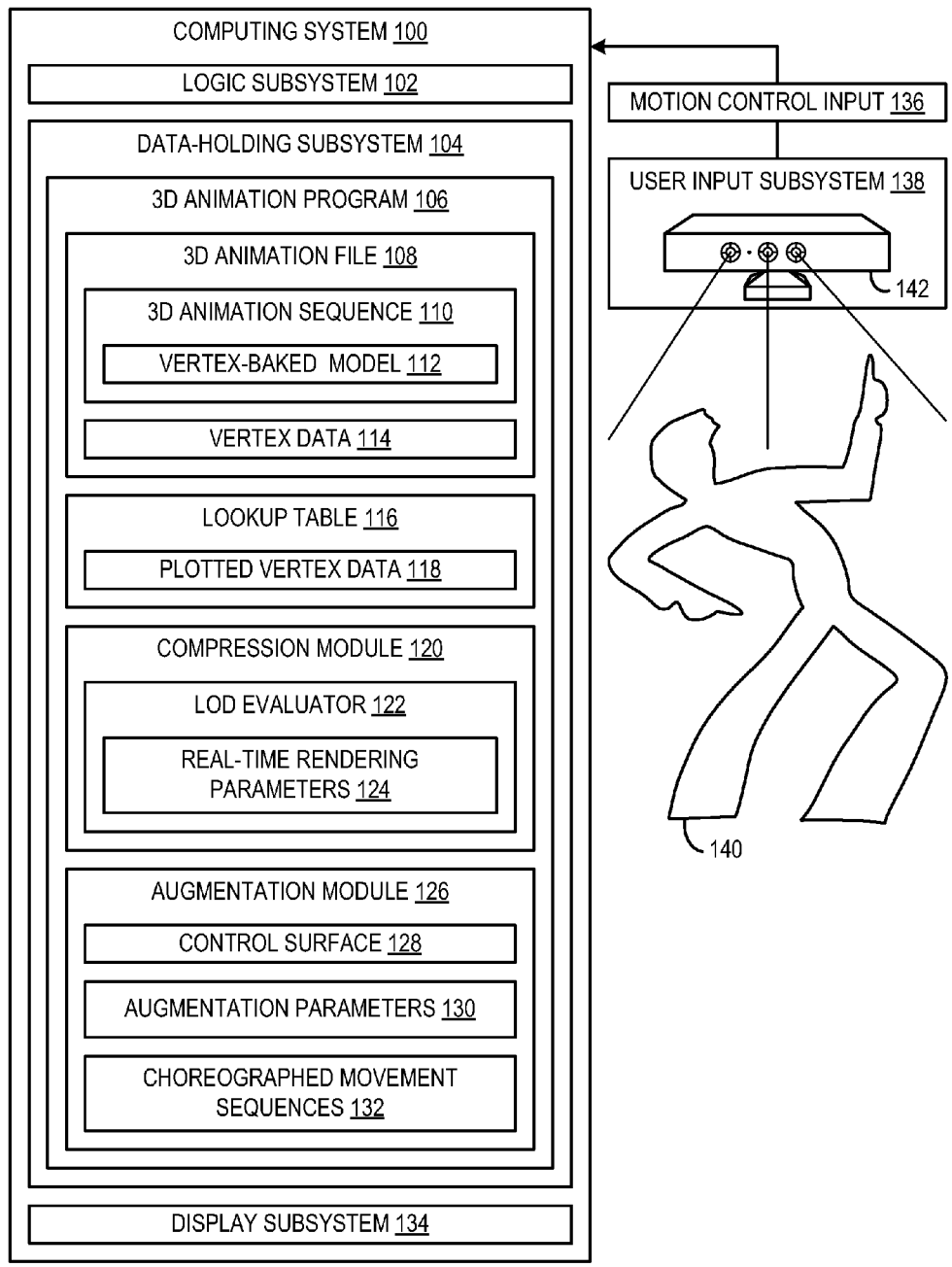
FIG. 1 schematically shows an embodiment of a computing system of the present disclosure.

The present description is directed to controlling presentation of a three-dimensional (3D) animation sequence in an interactive game setting. More particularly, the present description is directed to selectively controlling presentation of a 3D vertex-baked model derived from a 3D animation file that includes vertex data of every vertex for every frame in the 3D animation sequence. Since every vertex is plotted through the life of the 3D animation sequence in the 3D animation file, dynamic vertex position calculations performed at runtime can be reduced. This allows for rendering of the 3D vertex-baked model in the 3D animation sequence to be less computing resource intensive. Correspondingly, a level of detail (LOD) (e.g., a number of plotted vertices) of the 3D animation sequence can be increased or decreased as desired. By vertex-baking the 3D animation, which can be rendered in a less computing resource intensive manner, in some cases, the LOD of various portions of the 3D animation sequence can be increased to a high-resolution "cut-scene" or "movie-quality" LOD as desired, while still meeting game engine and device hardware processing constraints.

Moreover, the LOD of the 3D vertex-baked model can be increased to a greater LOD than a LOD of a comparable skeletal model. In particular, the LOD of the skeletal model may be reduced to allow for computing resources to be dedicated to dynamic position calculations for skinning the skeletal model at runtime so that the skeletal model can be rendered quick enough to satisfy user interaction.

Furthermore, the 3D vertex-baked model may include a control surface that is constructed from the vertex data in the 3D animation file to provide a best-fit 3D shape throughout the 3D animation sequence. During an augmentation portion of the 3D animation sequence, the control surface may be selectively driven by motion control input or other user input to deviate from a default posture.

For example, a 3D animation sequence that includes scripted movements of a high-resolution animated character may be incorporated into an interactive video game. The animated character may be defined by a 3D vertex-baked model that includes a control surface in the form of a skeleton. A sensing device that tracks a user's body movement may provide motion control input to drive the skeleton. During a specific augmentation portion of the 3D animated sequence, such as when the animated character is standing still or performing little or no scripted movement, presentation of the animated character may deviate from a default posture. At these times, the animated character may be presented in accordance with movement of the skeleton as driven by sensed motion of the user's body.

By enabling a user to provide input to drive, during at least a portion of a 3D animation sequence, a 3D vertex-baked model having a greater LOD than a LOD of a comparable skeletal animation, an entertainment experience of a user may be more realistic and immersive. Moreover, since vertex data for very vertex of the 3D animation sequence is baked (e.g. written to disk) for every 3D image frame of the 3D animation sequence, even with an increased LOD, the 3D animation sequence may be rendered quickly, while still meeting game engine and device hardware processing constraints.

FIG. 1 schematically shows a nonlimiting computing system 100 that may be configured to control presentation of 3D animation, for example in an interactive game setting. The computing system 100 is shown in simplified form. It is to be understood that virtually any computer architecture may be used without departing from the scope of this disclosure. In different embodiments, the computing system 100 may take the form of a gaming console, desktop computer, laptop computer, tablet computer, home entertainment computer, network computing device, mobile computing device, mobile communication device, mainframe computer, server computer, etc.

The computing system 100 includes a logic subsystem 102 and a data-holding subsystem 104. The computing system 100 may optionally include a display subsystem 134, a user input subsystem 138, and/or other components not shown in FIG. 1.

The logic subsystem 102 may include one or more physical devices configured to execute one or more instructions. For example, the logic subsystem may be configured to execute one or more instructions that are part of one or more applications, services, programs, routines, libraries, objects, components, data structures, development kits, or other logical constructs. Such instructions may be implemented to perform a task, implement a data type, transform the state of one or more devices, or otherwise arrive at a desired result.

The logic subsystem 102 may include one or more processors that are configured to execute software instructions. Additionally or alternatively, the logic subsystem 102 may include one or more hardware or firmware logic machines configured to execute hardware or firmware instructions. For example, the logic subsystem 102 may include one or more graphical processing units (GPUs) to calculate mathematical operations performed during graphics rendering, such as during rendering of 3D animation. Processors of the logic subsystem 102 may be single core or multicore, and the programs executed thereon may be configured for parallel or distributed processing. The logic subsystem 102 may optionally include individual components that are distributed throughout two or more devices, which may be remotely located and/or configured for coordinated processing. One or more aspects of the logic subsystem 102 may be virtualized and executed by remotely accessible networked computing devices configured in a cloud computing configuration.

The data-holding subsystem 104 may include one or more physical, non-transitory, devices configured to hold data and/or instructions executable by the logic subsystem 102 to implement the herein described methods and processes. When such methods and processes are implemented, the state of data-holding subsystem 104 may be transformed (e.g., to hold different data).

The data-holding subsystem 104 may include removable media and/or built-in devices. The data-holding subsystem 104 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 104 may include devices with one or more of the following characteristics: volatile, nonvolatile, dynamic, static, read/write, read-only, random access, sequential access, location addressable, file addressable, and content addressable.

In some embodiments, the logic subsystem 102 and the data-holding subsystem 104 may be integrated into one or more common devices, such as an application specific integrated circuit or a system on a chip. The data-holding subsystem 104 may include removable computer-readable storage media that may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others.

In some embodiments, aspects of the data-holding subsystem may be remotely located. As such, animation data may be remotely hosted and streamed to a local machine for display.

It is to be appreciated that the data-holding subsystem 104 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of the computing system 100 that is implemented to perform one or more particular functions. In some cases, such a module, program, or engine may be instantiated via the logic subsystem 102 executing instructions held by the data-holding subsystem 104. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

Continuing with FIG. 1, the data-holding subsystem 104 may hold instructions constituting a 3D animation program 106. In different embodiments, the 3D animation program 106 may take the form of, or be incorporated into, a software development kit, video game software, a game console application, operating system component, etc. The 3D animation program 106 may be configured to control rendering of 3D animation for display by display subsystem 134. In particular, the 3D animation program 106 may be configured to render a 3D animation sequence 110.

The 3D animation sequence 110 may be defined by a 3D animation file 108 that includes vertex data 114. In particular, the 3D animation sequence 110 may include a plurality of sequential 3D image frames. Each 3D image frame may include a plurality of vertices. Animation of the plurality of vertices from frame-to-frame may be defined by the vertex data 114. The vertex data 114 may include three-dimensional position data, orientation data, color data, texture data, lighting data, and/or other rendering data for every vertex in every 3D image frame in the 3D animation sequence 110.

The 3D animation sequence 110 may include a 3D vertex-baked model 112 that may be derived from the 3D animation file 108 that includes vertex data 114. In other words, the 3D vertex-baked model 112 may be animated using per-vertex animation. As an example, the 3D vertex-baked model 112 may be formed by a mesh of vertices in which the vertex data 114 is baked into each vertex of the mesh. The vertex data 114 may be mapped directly to the mesh of vertices and written to the data-holding subsystem 104, whereas in conventional skeletal animation, a skeletal model has skin or texture data that is associated with a bone. The bones are dynamically skinned or updated with animation data on the fly as opposed to being baked. It will be appreciated that the 3D vertex-baked model 112 may include virtually any suitable 3D animation, such as animation of a character or an object in a virtual scene.

In some embodiments, the 3D animation file 108 may be stored remote from the computing system 100, such as on a remote server computing device or in a computing "cloud". In such embodiments, the 3D animation file 108 may be sent or streamed to the 3D animation program 106.

The 3D animation program 106 may be configured to plot the vertex data 114 for every vertex in the 3D animation sequence 110 and generate a lookup table 116 of plotted vertex data 118. The lookup table 116 may organize the plotted vertex data 118 so it is quickly and easily accessible during rendering of the 3D animation sequence 110.

The 3D animation program 106 may include a compression module 120 to compress the plotted vertex data 118 or lower the LOD of image portions of the 3D animation sequence 110 prior to rendering. In some cases, the plotted vertex data 118 may be streamed using LOD adjustment techniques in accordance with real-time rendering parameters 124. By lowering the LOD of some image portions of the 3D animation sequence 110, rendering may be less resource intensive since not all vertex data need be retrieved for rendering of the 3D animation sequence 110. Moreover, compression of the plotted vertex data 118 may allow for detailed animation to be rendered on hardware constrained devices.

The compression module 120 may include a LOD evaluator 122 configured to evaluate the plotted vertex data 118 of the 3D animation sequence 110 to identify one or more image regions in the 3D animation sequence 110 where a LOD can be adjusted for faster rendering. An image region may include any portion including a vertex of any 3D image frame in the 3D animation sequence 110. The LOD evaluator 122 may be configured to evaluate image regions in the 3D animation sequence 110 in accordance with one or more real-time rendering parameters 124. The real-time rendering parameters 124 may include at least one of a focal point of a scene in the 3D animation sequence, a distance from the focal point to the image region, and a viewing angle of the image region. The real-time rendering parameters 124 may be applied to the 3D animation sequence 110 to evaluate whether or not an image region is a central aspect of a scene that is the focus of a viewer.

Upon identifying image regions suitable for compression, the compression module 120 may be configured to adjust a LOD of an image region in the 3D animation sequence 110 from a default LOD of the image region. Adjusting the LOD of an image region may be performed through different operations. For example, algorithms may be applied to the plotted vertex data 118 to compress the vertex data as pseudo animation curves or dimensional curves. As another example, LOD may be adjusted by varying a vertex position sampling rate during rendering. For example, vertex data for an image region may be sampled from the lookup table 116 at a default rate for every 3D image frame, and the LOD may be lowered by adjusting sampling to every other 3D image frame, or every tenth 3D image frame. By adjusting the LOD of different image regions in the 3D animation sequence 110, computing resources need not be dedicated to rendering image regions with a high LOD that are not a focus of the viewer. Accordingly, rendering may be carried out faster, or other image regions that are the focus of a viewer may be rendered with an increased LOD.

The 3D animation program 106 may include an augmentation module 126 configured to evaluate the plotted vertex data 118 of the 3D animation sequence 110 for patterns and/or areas of motion of the 3D vertex-baked model 112 to construct a control surface 128. The control surface 128, which is included in the 3D vertex-baked model 112, provides a best-fit 3D shape to vertices of the 3D vertex-baked model 112. The control surface 128 may be best-fit to vertices of the 3D vertex-baked model 112 on a frame-by-frame basis over the course of the 3D animation sequence 110 to create a default posture for the control surface 128. In other words, the plotted vertex data 118 may be reverse engineered to construct the control surface 128. The control surface 128 may take the form of different shapes. As one example, the control surface 128 may include a skeleton including a plurality of skeletal joints.

The control surface 128 may be selectively controlled in accordance with motion control input 136. In particular, the 3D animation program 106 may be configured to receive the motion control input 136. In some embodiments, the motion control input 136 may be provided by a user 140 through interaction with the user input subsystem 138. The control surface 128 may allow for a user to selectively control motion of the 3D vertex-baked model 112 by moving the control surface to deviate from a default posture defined by the 3D animation sequence 110.

In the illustrated embodiment, the user input subsystem 138 includes a sensing device 142 configured to detect movement of a user 140. In one example, the sensing device 142 may include a red, green, blue (RGB) camera and a depth sensor that provide full-body 3D motion capture of the user 140. Correspondingly, the control surface 128 may include a human skeleton to track the user's body movement. In different embodiments, the user input subsystem 138 may take the form of a keyboard, mouse, game controller, microphone, and/or touch screen, for example.

Upon receiving the motion control input 136, the augmentation module 126 may be configured to determine if the motion control input 136 is received during an augmentation portion of the 3D animation sequence. An augmentation portion may include a portion of the 3D animation sequence where the 3D vertex-baked model is relatively still or does not make large movements. In one example, an augmentation portion may be defined as a consecutive series of 3D image frames in the 3D animation sequence 110 where a selected set of the vertices of the 3D vertex-baked model collectively change position less than a movement threshold. The augmentation portions provide an opportune time in the 3D animation sequence 110 for the user 140 to control motion of the control surface 128 in order to control presentation of the 3D vertex-baked model 112 with little or no deformation.

The augmentation module 126 may be configured to evaluate the plotted vertex data 118 in order to determine when augmentation portions occur throughout the 3D animation sequence 110. The augmentation portions may be determined based on augmentation parameters 130. In one example, the augmentation parameters 130 may include one or more movement thresholds for a selected set of vertices of the 3D vertex-baked model 112. The augmentation module may determine that an augmentation portion occurs when the selected set of vertices of the 3D vertex-baked model 112 moves by an amount that is less than a movement threshold over a selected series of 3D image frames.

If the motion control input is received during an augmentation portion of the 3D animation sequence 110, the augmentation module 126 may be configured to deviate from a default posture of the control surface 128 in accordance with the motion control input 136. As one example, deviating may include moving the control surface in accordance with the motion control input. In one example, movement of the motion control surface may mimic movement of the user 140 as captured by the sensing device 142. As another example, deviating may include initiating a choreographed control surface movement sequence 132 that is triggered by the motion control input 136. Choreographed control surface movement sequences 132 may include different animation loops derived from the 3D animation file 108 (or another source) that may be played throughout the 3D animation sequence. An example of a choreographed control surface movement sequence may include a dance routine performed by an animated character representative of the 3D vertex-baked model 112 that can be initiated by the user 140 making a recognized gesture during an augmentation portion of the 3D animation sequence 110.

In some embodiments, control surface augmentation may be disabled outside of augmentation portions. Additionally or alternatively, motion control input may be dismissed outside of augmentation portions.

The display subsystem 134 may be used to present a visual representation of data held by data-holding subsystem 104. More particularly, the display subsystem 134 may present 3D animation rendered by the 3D animation program 106. As the herein described methods and processes change the data held by the data-holding subsystem, and thus transform the state of the data-holding subsystem, the state of display subsystem 134 may likewise be transformed to visually represent changes in the underlying data. Display subsystem 134 may include one or more display devices utilizing virtually any type of technology. Such display devices may be combined with logic subsystem 102 and/or data-holding subsystem 104 in a shared enclosure, or such display devices may be peripheral display devices.

Figure 2:
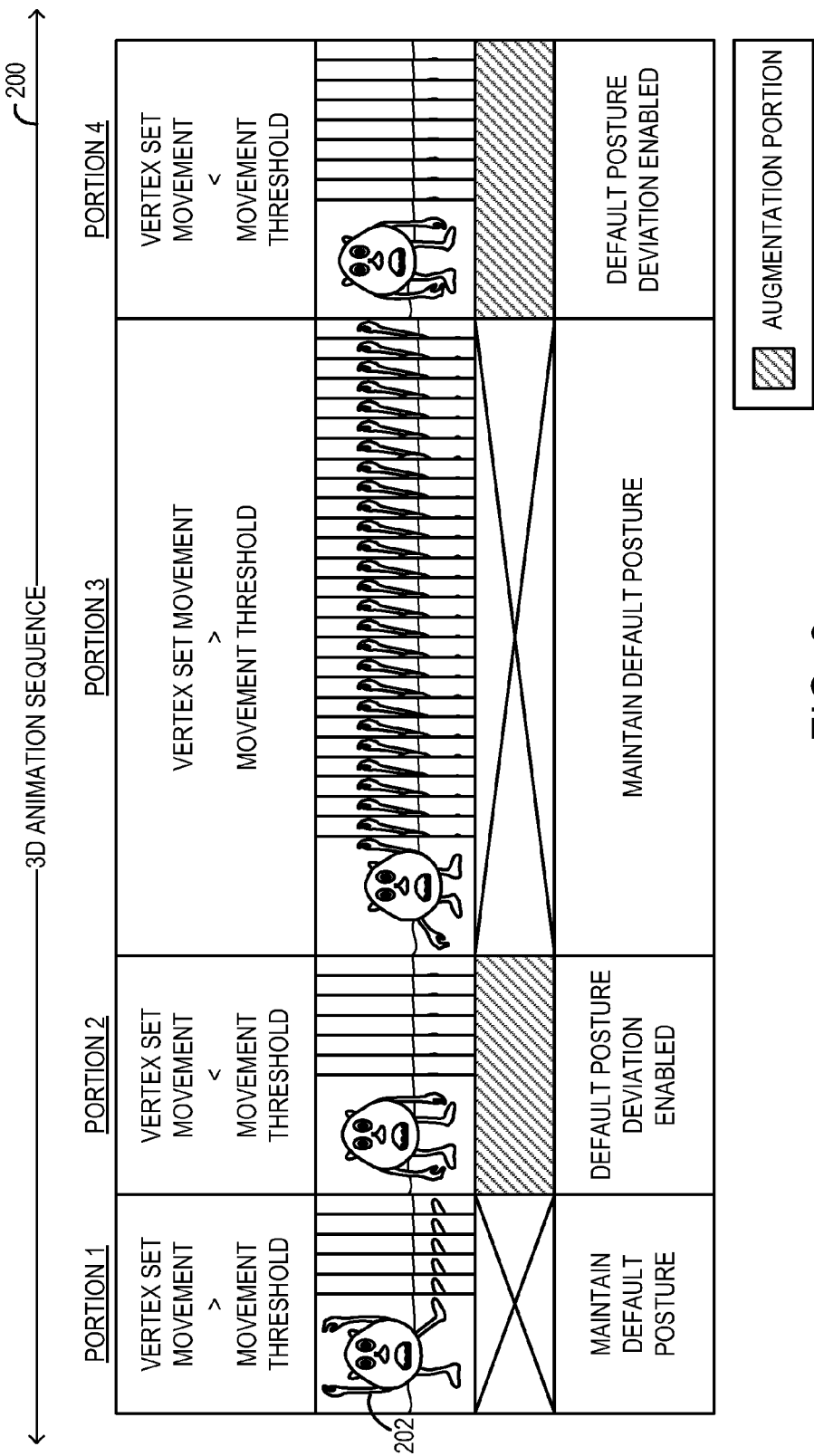
FIG. 2 shows an example three dimensional (3D) animation sequence including augmentation portions in which presentation of a 3D vertex-baked model can be selectively controlled by motion control input.

FIG. 2 shows an example 3D animation sequence 200 in which presentation of a 3D vertex-baked model 202 can be selectively controlled by motion control input. In particular, the 3D vertex-baked model 202 may be controlled by motion control input during augmentation portions. Such augmentation portions may occur over a consecutive series of image frames where vertices of a control surface of the 3D vertex-baked model 202 move by an amount less than a movement threshold. During such augmentation portions, the 3D vertex-baked model 202 appears relatively still or has little or no movement. Accordingly, deviation from a default posture does not interfere with an intricate scripted movement or cause deformation of the 3D vertex-baked model.

In a first portion of the animation sequence 200, the 3D vertex-baked model 202 performs vastly changing movements in which the 3D vertex-baked model 202 is waving its arms and legs. Such movements cause a set of vertices of the 3D vertex-baked model to move by an amount greater than a movement threshold. Accordingly, the first portion is determined to not be an augmentation portion and the control surface of the 3D vertex-baked model maintains a default posture during the first portion. Correspondingly, motion control input received during the first portion to control movement of the control surface may be dismissed.

In a second portion of the animation sequence 200, the 3D vertex-baked model 202 is standing still. Such movements (or lack thereof) cause a set of vertices of the 3D vertex-baked model to move less than the movement threshold. Accordingly, the second portion is determined to be an augmentation portion and deviation from the default posture is enabled for the second portion. In other words, motion control input may control movement of the 3D vertex-baked model during the second portion.

In a third portion of the animation sequence 200, the 3D vertex-baked model 202 is crouching while raising one arm. Such movements cause a set of vertices of the 3D vertex-baked model to move by an amount greater than a movement threshold. Accordingly, the third portion is determined to not be an augmentation portion and the control surface of the 3D vertex-baked model maintains a default posture during the third portion. Correspondingly, motion control input received during the third portion to control movement of the control surface may be dismissed.

In a fourth portion of the animation sequence 200, the 3D vertex-baked model 202 is standing still. Such movements (or lack thereof) cause a set of vertices of the 3D vertex-baked model to move less than the movement threshold. Accordingly, the fourth portion is determined to be an augmentation portion and deviation from the default posture is enabled for the fourth portion. In other words, motion control input may control movement of the 3D vertex-baked model during the fourth portion. Note if no motion control input is provided during the augmentation portions of the 3D animation sequence, the control structure may maintain a default posture.

Figure 3:
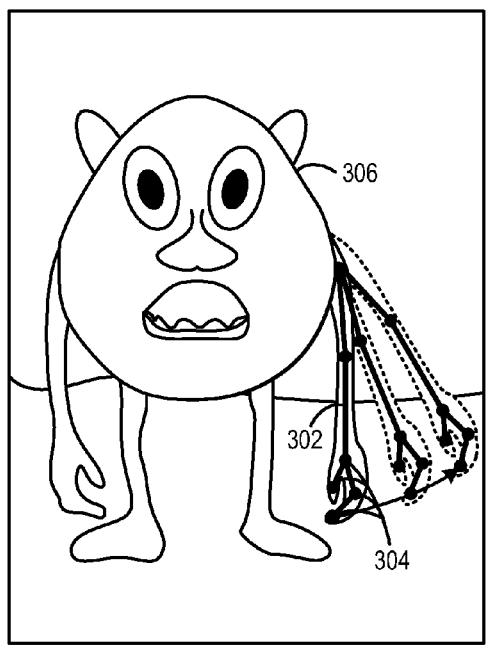
FIG. 3 shows an example of a control surface that deviates from a default posture and moves in accordance with motion control input.

FIG. 3 shows an example of a control surface 302 that deviates from a default posture and moves in accordance with motion control input. As discussed above, the control surface 302 takes the form of a best-fit 3D shape to vertices 304 that make up the 3D vertex-baked model 306. In this example, the control surface 302 takes the shape of a skeleton that fits an arm formed by the vertices 304. The default posture (shown in solid outline) includes the skeleton hanging straight down. Movement of the control surface in accordance with motion control input (shown in dashed outline) causes the skeleton to deviate from the default posture and move upward and outward away from the default posture. Correspondingly, the vertices 304 move with the control surface 302 so that the rendered arm of the 3D vertex-baked model 306 is aligned with the underlying skeleton or control surface 302.

In some embodiments, the portion of the control surface that deviates from the default posture may be rendered via skeletal animation and a portion of the control surface that maintains the default posture may be rendered via vertex-baked animation. The skeletal animation and the vertex-baked animation may be blended at runtime/rendering by utilizing multiple steams of texture data.

Figure 4:
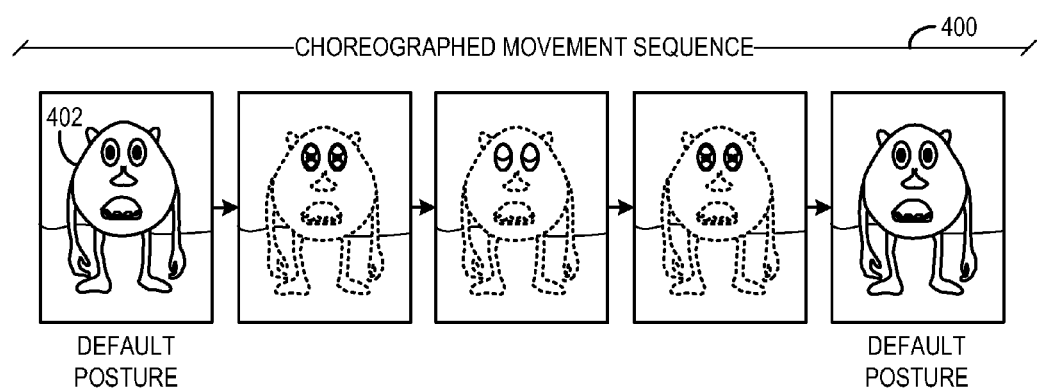
FIG. 4 shows an example of a choreographed control surface movement sequence.

FIG. 4 shows an example of a choreographed control surface movement sequence 400. The choreographed control surface movement sequence 400 may be triggered by motion control input during an augmentation portion of a 3D animation sequence. In the illustrated example, an animated character 402 representative of a 3D vertex-baked model including a control surface is in a default posture with one eye that is open. When the choreographed control surface movement sequence 400 is initiated, an animation loop that may be derived from a scripted movement of the 3D vertex-baked model in the 3D animation sequence may be rendered. In the choreographed control surface movement sequence the control surface that forms the eye of the animated character 402 deviates from the default posture and performs an animated winking motion before returning to the default posture.

In some embodiments, different choreographed control surface movement sequences may be initiated by different motion control input. In embodiments where motion control input is provided from movement of a user's body, different choreographed control surface movement sequences may be initiated by different gestures performed by the user.

Figure 5:
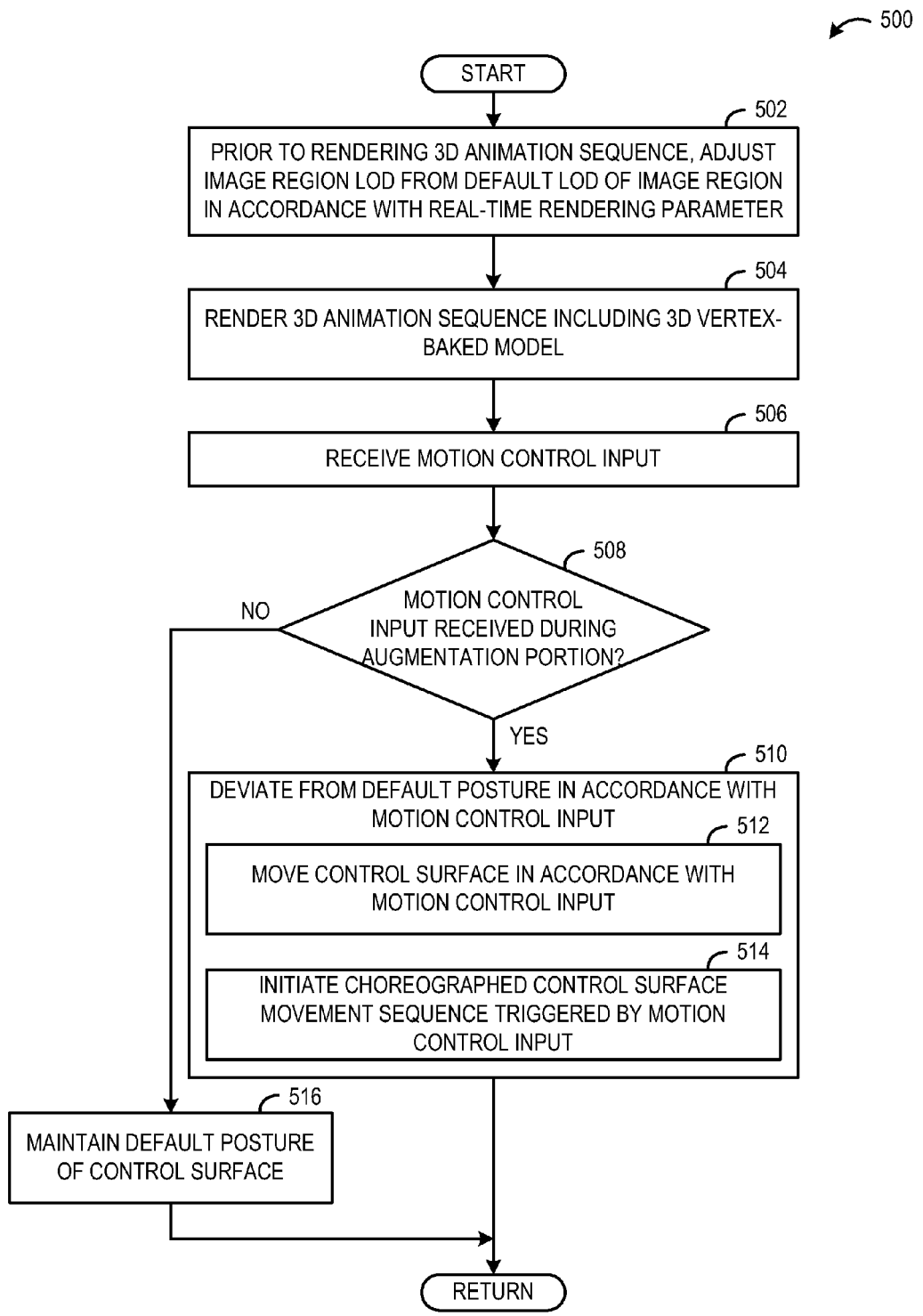
FIG. 5 shows an embodiment of a method for controlling presentation of a 3D animation.

FIG. 5 shows an embodiment of a method 500 for controlling presentation of a 3D animation. At 502, the method may include prior to rendering a 3D animation sequence, adjusting a level of detail (LOD) of an image region in the 3D animation sequence from a default level of detail of the image region in accordance with a real-time rendering parameter. The real-time rendering parameter may include at least one of a focal point of a scene in the 3D animation sequence, a distance from the focal point to the image region, and a viewing angle of the image region. In one example, a LOD of the image region may be lowered if the region is determined not to be a focus of the 3D animation sequence in accordance with the real-time rendering parameter. By adjusting the LOD of some image regions in the 3D animation sequence, rendering of the 3D animation sequence may be performed more quickly.

At 504, the method may include rendering the 3D animation sequence. The 3D animation sequence may include a 3D vertex-baked model derived from a 3D animation file including vertex data of every vertex for every 3D image frame in the 3D animation sequence. The 3D vertex-baked model may include a control surface providing a best-fit 3D shape to vertices of the 3D vertex-baked model.

At 506, the method may include receiving motion control input. In one example, motion control input is provided by a sensing device in response to detecting movement of a user's body.

At 508, the method may include determining if the motion control input is received during an augmentation portion of the 3D animation sequence. In one example, an augmentation portion includes a consecutive series of 3D image frames in the 3D animation sequence where a selected set of the vertices of the 3D vertex-baked model collectively change position less than a movement threshold. If it is determined that the motion control input is received during an augmentation portion, the method moves to 510. Otherwise, the method moves to 514.

At 510, the method may include deviating from a default posture of the control surface in accordance with the motion control input.

At 512, in some cases, deviating may include moving the control surface in accordance with the motion control input. In one example, the control surface may include a skeleton that moves in accordance with motion control input that is provided by a sensing device in response to detecting movement of a user's body. Accordingly, motion of the 3D vertex-baked model may track movement of the user's body during the augmentation portion of the 3D animation sequence.

At 514, in some cases, deviating may include initiating a choreographed control surface movement sequence that is triggered by the motion control input. As an example, motion control input indicative of a gesture where a user raises their hand and points their finger may trigger a choreographed dance routine performed by a control surface skeleton of a 3D vertex-baked model of an animated character. The choreographed dance routine may deviate from the default posture of the control surface skeleton as defined by vertex data of 3D animation file.

At 516, the method may include maintaining the default posture of the control surface when motion control data is received during a time other than an augmentation portion of the 3D animation sequence. In one example, received motion control data is dismissed and the default posture of the control surface is maintained when motion control data is received outside of an augmentation portion where a selected set of vertices in the 3D vertex-baked model collectively change position greater than a movement threshold over a consecutive series of 3D image frames in the 3D animation sequence.

By deviating from the default posture of the control surface only during augmentation portions of the 3D animation sequence, a user is able to selectively control movement of the 3D vertex-baked model without causing any abnormal or disconnected movements resulting in deformation of animation of the 3D vertex-baked model. In other words, modifications are avoided that are not supported for rendering with the baked-vertex data that is available. Accordingly, a user may be provided with a more immersive and realistic entertainment experience.

In some embodiments, the above described methods and processes may be tied to a computing system including one or more computers. In particular, the methods and processes described herein may be implemented as a computer application, computer service, computer API, computer library, and/or other computer program product. In one example, the methods may be performed by 3D animation program 106 of computing system 100 shown in FIG. 1.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for controlling presentation of a three dimensional (3D) animation sequence with a computing device, comprising:
   rendering the 3D animation sequence from a 3D animation file including vertex data of every vertex for every 3D image frame in the 3D animation sequence;
   providing a 3D vertex-baked model derived from the vertex data of the 3D animation file, the 3D vertex-baked model including a control surface providing a best-fit 3D shape to vertices of the 3D vertex-baked model;
   evaluating the vertex data of the 3D animation file to identify one or more augmentation portions within the 3D animation sequence, the one or more augmentation portions including a consecutive series of 3D image frames in the 3D animation sequence where a selected set of the vertices of the 3D vertex-baked model collectively change position less than a movement threshold;
   presenting the 3D animation sequence on a display device;
   during presentation of the 3D animation sequence, receiving a motion control input; and
   if the motion control input is received during presentation of the one or more augmentation portions of the 3D animation sequence, deviating from a default posture of the control surface in accordance with the motion control input.

2. The method of claim 1, wherein deviating includes moving the control surface in accordance with the motion control input.

3. The method of claim 1, wherein deviating includes initiating a choreographed control surface movement sequence that is triggered by the motion control input.

4. The method of claim 1, further comprising:
   maintaining the default posture of the control surface when the selected set of vertices in the 3D vertex-baked model collectively change position greater than the movement threshold over the consecutive series of 3D image frames in the 3D animation sequence.

5. The method of claim 1, further comprising:
   prior to rendering the 3D animation sequence, adjusting a level of detail of an image region in the 3D animation sequence from a default level of detail of the image region in accordance with a real-time rendering parameter.

6. The method of claim 5, wherein the real-time rendering parameter includes at least one of a focal point of a scene in the 3D animation sequence, a distance from the focal point to the image region, and a viewing angle of the image region.

7. The method of claim 1, wherein the control surface includes a skeleton.

8. The method of claim 7, wherein the motion control input to control the skeleton is provided by a sensing device in response to detecting movement of a user's body.

9. The method of claim 1, wherein the vertex data includes 3D position data, orientation data, color data, texture data, and lighting data for every vertex in the 3D vertex-baked model.

10. A data-holding subsystem holding instructions executable by a logic device to:
    render a 3D animation sequence from a 3D animation file including vertex data of every vertex for every 3D image frame in the 3D animation sequence;
    provide a 3D vertex-baked model derived from the vertex data of the 3D Animation file, the 3D vertex-baked model including a control surface providing a best-fit 3D shape to vertices of the 3D vertex-baked model;
    evaluate the vertex data of the 3D animation file to identify one or more augmentation portions within the 3D animation sequence, the one or more augmentation portions including a consecutive series of 3D image frames in the 3D animation sequence where a selected set of the vertices of the 3D vertex-baked model collectively change position less than a movement threshold;
    present the 3D animation sequence on a display device;
    during presentation of the 3D animation sequence, receive a motion control input;
    if the motion control input is received during presentation of the one or more augmentation portions of the 3D animation sequence, deviate from a default posture of the control surface in accordance with the motion control input.

11. The data-holding subsystem of claim 10, wherein deviating includes moving the control surface in accordance with the motion control input.

12. The data-holding device of claim 10, wherein deviating includes initiating a choreographed control surface movement sequence that is triggered by the motion control input.

13. The data-holding device of claim 10, wherein the data-holding device further holds instructions executable by the logic device to:
    maintain the default posture of the control surface when the selected set of vertices in the 3D vertex-baked model collectively change position greater than the movement threshold over the consecutive series of 3D image frames in the 3D animation sequence.

14. The data-holding device of claim 10, wherein the control surface includes a skeleton.

15. The data-holding device of claim 14, wherein the motion control input to control the skeleton is provided by a sensing device in response to detecting movement of a user's body.

16. The data-holding device of claim 10, wherein the 3D vertex-baked model is defined by vertex data including three-dimensional position data, orientation data, color data, texture data, and lighting data for every vertex in the vertex-baked model.

17. A method for controlling presentation of a three dimensional (3D) animation with a computing device, comprising:
    rendering a 3D animation sequence from a 3D animation file including vertex data of every vertex for every 3D image frame in the 3D animation sequence;
    providing a 3D vertex-baked model derived from the vertex data of the 3D animation file, the 3D vertex-baked model including a control skeleton providing a best-fit 3D shape to vertices of the 3D vertex-baked model;
    evaluating the vertex data of the 3D animation file to identify one or more augmentation portions within the 3D animation sequence;
    presenting the 3D animation sequence on a display device;
    during presentation of the 3D animation sequence, receiving a motion control input from a sensing device in response to detecting movement of a user's body; and
    if the motion control input is received during presentation of the one or more augmentation portions of the 3D animation sequence where a selected set of the vertices of the 3D vertex-baked model collectively change position less than a movement threshold over a consecutive series of 3D image frames in the 3D animation sequence, deviating from a default posture of the control skeleton to move the control skeleton in accordance with the motion control input, a portion of the control skeleton in a 3D image frame that deviates from the default posture being rendered via skeletal animation and a portion of the control skeleton in the 3D image frame that maintains the default posture being rendered via vertex-baked animation.

18. The method of claim 17, further comprising:
    maintaining the default posture of the skeleton when the selected set of vertices in the 3D vertex-baked model collectively change position greater than the movement threshold over the consecutive series of 3D image frames in the 3D animation sequence.

* * * * *